(12) United States Patent
Liu

(10) Patent No.: US 12,231,887 B2
(45) Date of Patent: Feb. 18, 2025

(54) CELLULAR NETWORK AUTHENTICATION USING A MEMORY SECURITY TOKEN

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/593,815

(22) Filed: Mar. 1, 2024

(65) Prior Publication Data

US 2024/0205675 A1 Jun. 20, 2024

Related U.S. Application Data

(63) Continuation of application No. 17/335,933, filed on Jun. 1, 2021, now Pat. No. 11,924,638.

(51) Int. Cl.
| | |
|---|---|
| *H04W 88/02* | (2009.01) |
| *H04L 9/32* | (2006.01) |
| *H04W 12/06* | (2021.01) |
| *H04W 12/069* | (2021.01) |
| *H04W 12/08* | (2021.01) |
| *H04W 12/12* | (2021.01) |
| *H04W 84/04* | (2009.01) |

(52) U.S. Cl.
CPC ......... *H04W 12/069* (2021.01); *H04L 9/3247* (2013.01); *H04L 9/3268* (2013.01); *H04L 9/3278* (2013.01); *H04W 12/08* (2013.01); *H04L 2209/80* (2013.01); *H04W 84/042* (2013.01)

(58) Field of Classification Search
CPC . H04W 12/069; H04W 12/08; H04W 84/042; H04L 9/3247; H04L 9/3268; H04L 9/3278; H04L 2209/80
See application file for complete search history.

(56) References Cited

U.S. PATENT DOCUMENTS

| | | | |
|---|---|---|---|
| 11,924,638 B2 | 3/2024 | Liu | |
| 2006/0195893 A1* | 8/2006 | Caceres | H04L 63/0823 726/8 |
| 2014/0189890 A1* | 7/2014 | Koeberl | G09C 1/00 726/34 |

(Continued)

OTHER PUBLICATIONS

IP.com (Year: 2024).*

(Continued)

*Primary Examiner* — Moustapha Diaby
(74) *Attorney, Agent, or Firm* — Greenberg Traurig

(57) ABSTRACT

The disclosed embodiments relate to authenticating devices to a cellular network. In one embodiment, a method is disclosed comprising reading a mobile identifier from a storage area of a memory device, the mobile identifier comprising a value associated with a subscriber of a cellular network; signing the mobile identifier using a private key to generate a digital signature, the private key generated using a physically unclonable function (PUF); transmitting the digital signature and a public key to a cellular network, the public key associated with the private key; and receiving, from the cellular network, a confirmation of access to the cellular network, the confirmation generated based on the public key and the digital signature.

20 Claims, 6 Drawing Sheets

(56) References Cited

U.S. PATENT DOCUMENTS

| | | |
|---|---|---|
| 2016/0253520 A1 | 9/2016 | Moon et al. |
| 2017/0134176 A1* | 5/2017 | Kim ...................... H04L 9/0866 |
| 2018/0131765 A1* | 5/2018 | Puleston ................ G11C 11/00 |
| 2020/0195447 A1* | 6/2020 | Shin ...................... H04L 63/164 |
| 2020/0313911 A1* | 10/2020 | Mondello ............. H04L 9/3268 |
| 2021/0058786 A1* | 2/2021 | Yang .................. H04W 12/069 |
| 2021/0105265 A1* | 4/2021 | Yang .................. H04W 12/047 |
| 2021/0112411 A1* | 4/2021 | Pazhyannur .......... H04W 12/06 |
| 2021/0145076 A1 | 5/2021 | Barbaric et al. |
| 2021/0168610 A1* | 6/2021 | Adrangi ............... H04W 48/18 |
| 2022/0386125 A1 | 12/2022 | Liu |

OTHER PUBLICATIONS

ProQuest (Year: 2024).*
International Search Report and Written Opinion, PCT/US2022/031169, mailed on Sep. 6, 2022.
U.S. Appl. No. 17/335,933, filed Jun. 1, 2021, Zhan Liu, Cellular Network Authentication using a Memory Security Token.

* cited by examiner

CELLULAR NETWORK AUTHENTICATION USING A MEMORY SECURITY TOKEN

RELATED APPLICATIONS

The present application is a continuation application of U.S. patent application Ser. No. 17/335,933 filed Jun. 1, 2021, issued as U.S. Pat. No. 11,924,638, on Mar. 5, 2024 the entire disclosure of which application is hereby incorporated herein by reference.

TECHNICAL FIELD

At least some embodiments disclosed herein relate to memory devices in general, and more particularly, but not limited to authenticating to a cellular network using a memory device security token.

BACKGROUND

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
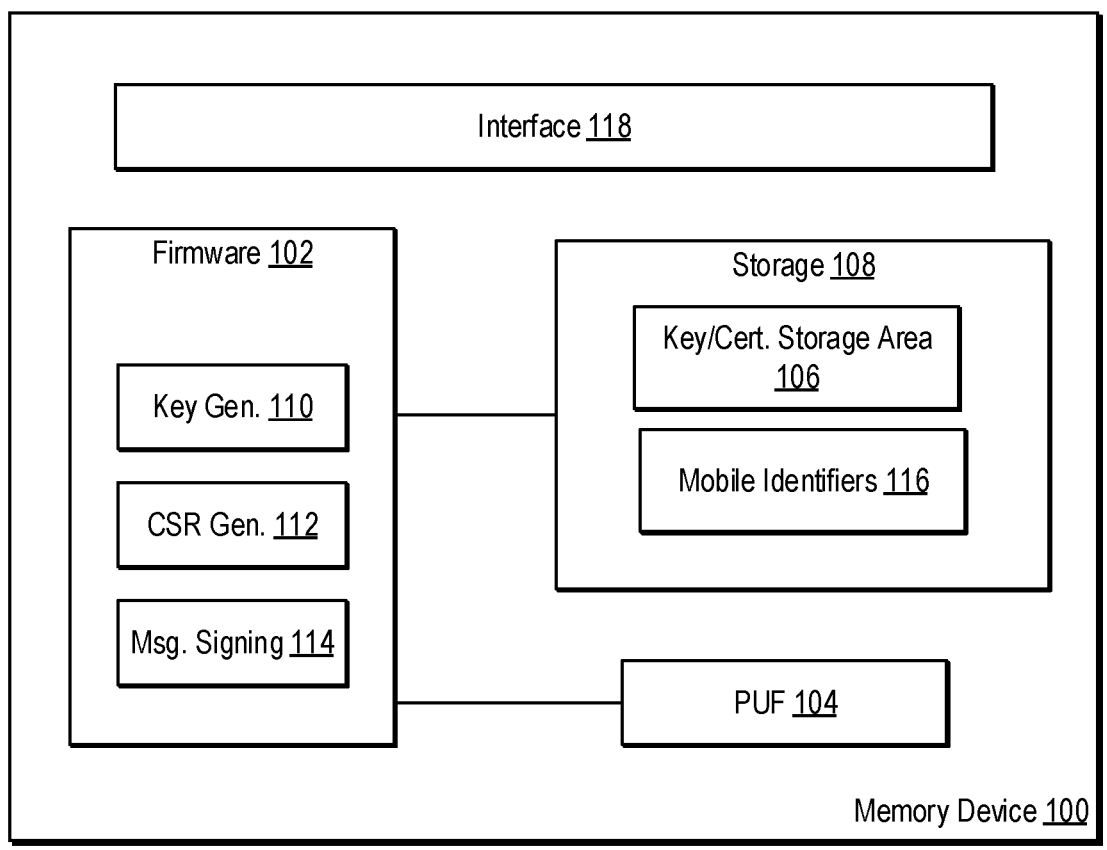
FIG. 1 is a block diagram of a memory device according to some embodiments of the disclosure.

In various embodiments, a memory device is described, which includes an interface (e.g., serial peripheral interface, universal serial bus, etc.) that enables the memory device to act as a security token for the operation of a computing system (e.g., computer, solid-state drive, mobile phone). The memory device includes a physically unclonable function that can be used to generate a public/private key pair. The public key of the device can be signed by a trusted certificate authority to generate a digital certificate for the memory device. The digital certificate can contain personal or organizational unique identity information (e.g., name, driver license number, etc.) to indicate that the device belongs to the owner. When configured as such, the memory device functions as a security token.

A mobile device equipped with the memory device stores one or more mobile identifiers. The mobile identifiers can be used to uniquely identify a cellular subscriber. Thus, if these mobile identifiers are cloned, a malicious party can incur charges on the account associated with the mobile identifiers. Generally, a malicious party that obtains the mobile identifiers submits these mobile identifiers to the cellular network to authenticate and can then communicate using the cellular network under the account holder's identity.

When connecting to a cellular network (e.g., during network attachment or when placing a call, etc.), the mobile device signs the mobile identifiers with the private key. The choice of when to send the signed data can depend on the signed data. For example, an electronic serial number may be signed before each call, whereas an international mobile subscriber identity may only be signed during network attachment. In some embodiments, the mobile device can sign any values in advance and store these signed values for future use. In some embodiment, the mobile device can further generate a random nonce in the data to be signed in order to prevent a replay attack. After signing, the mobile device then transmits the signature and the public key to the cellular network.

In response, a computing device in the cellular network (e.g., a computing device in a base station, a Home Subscriber Server, etc.) can verify the signature using the received public key. Next, the computing device can check the certificate to determine the owner of the public key. The server can analyze the certificate verification. If the certificate does not indicate an owner, the server can flag the transmission as fraudulent or perform some other remedial action. If the certificate indicates an owner, the server can then check if a corresponding cellular network owner exists. If the server finds a corresponding owner, the server can process the request under the owner's account (e.g., can bill the owner). If the server does not find a corresponding owner, the server can flag the transmission as fraudulent or perform some other remedial action.

Thus, the various embodiments provide a memory device that can be "plugged" into a mobile phone and immediately transfer an owner's cellular account to a new phone. In some embodiments, the disclosed embodiments allow for authentication to a cellular network without the use of a Subscriber Identity Module (SIM) card.

FIG. 1 is a block diagram of a memory device according to some embodiments of the disclosure.

In an embodiment, a memory device (100) can comprise a non-volatile memory device such as a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD).

In an embodiment, the memory device (100) includes a storage medium (108). In an embodiment, a storage medium (108) can comprise an array of memory cells. In one embodiment, a storage medium (108) can comprise an array of NAND Flash cells. One type of memory cell, for example, single-level cells (SLC), can store one bit per cell. Other types of memory cells, such as multi-level cells (MLCs), triple-level cells (TLCs), quad-level cells (QLCs), and penta-level cells (PLCs), can store multiple bits per cell. In some embodiments, the storage medium (108) can include one or more arrays of memory cells such as SLCs, MLCs, TLCs, QLCS, PLCs, or any combination of such. In some embodiments, a memory device (100) can include an SLC portion, an MLC portion, a TLC portion, a QLC portion, and/or a PLC portion of memory cells. The memory cells of the storage medium (108) can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device (100) can be based on any other type of non-volatile memory, such as read-only memory (ROM), phase-change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, electrically erasable programmable read-only memory (EEPROM), etc.

In an embodiment, the storage medium (108) includes a key and certificate storage area (106). In an embodiment, the key and certificate storage area (106) can comprise a write-protected region of storage medium (108). In another embodiment, the key and certificate storage area (106) can comprise a physically separate storage area of the storage medium (108). In some embodiments, the key and certificate storage area (106) can comprise a volatile storage area. In one embodiment, the key and certificate storage area (106) can comprise separate storage areas for keys and certificates. In such an embodiment, the storage area for keys can be volatile storage, while the storage area for certificates can comprise non-volatile storage.

In alternative embodiments, the storage medium (108) can further include a dedicated mobile identifier storage area (116). In the illustrated embodiment, the mobile identifier storage area (116) can store mobile identifiers such as an electronic serial number (ESN), mobile device number (MDN), Cellular Telephone Number (CTN), International Mobile Equipment Identity (IMEI), international mobile subscriber identity (IMSI), mobile equipment identifier (MEID), Subscription Permanent Identifier (SUPI), Subscription Concealed Identifier (SUCI), or similar types of values used by a cellular network to identify a subscriber or mobile device. In some embodiments, the mobile identifier storage area (116) can also store signatures associated with each, or combinations, of the mobile identifiers. In some embodiments, the mobile identifier storage area (116) comprises a write-protected region of the storage medium (108).

In an embodiment, memory device (100) includes a physically unclonable function, PUF (104). In the illustrated embodiment, the PUF (104) may comprise a physical hardware circuit that exploits inherent randomness introduced during manufacturing to give a physical entity a unique 'fingerprint' or trust anchor. In the illustrated embodiment, the PUF (104) produces a consistent and repeatable value. In some embodiments, the PUF (104) may comprise an SRAM PUF, Delay PUF, or any other PUF technology implemented on the memory device (100).

In the illustrated embodiment, memory device (100) includes firmware (102). In one embodiment, firmware (102) comprises a non-transitory computer-readable storage medium for tangibly storing computer program instructions capable of being executed by a computer processor, the computer program instructions defining various steps described herein. In the illustrated embodiment, firmware (102) can be stored in a dedicated storage device such as read-only memory (ROM), erasable programmable ROM (EPROM), electrically erasable programmable ROM (EEPROM), or Flash (NAND or NOR) memory. In the illustrated embodiment, the firmware (102) implements various functions, including, but not limited to, key generation logic (110), certificate signing request logic (112), and message signing logic (114). Certainly, firmware (102) can implement additional functions such as lower-level hardware control functions. These additional functions are not described in detail for the sake of clarity. Firmware (102) can be configured to execute the functionality described in block 402, 404, and 406 of FIG. 4.

In the illustrated embodiment, key generation logic (110) comprises executable code and/or dedicated hardware circuitry to generate an asymmetric key pair. In the illustrated embodiment, the key generation logic (110) reads a value from PUF (104) and uses this value to generate a public/private key pair. In some embodiments, the key generation logic (110) can generate a public/private key pair using an asymmetric or public-key cryptosystem. For example, a Rivest-Shamir-Adleman (RSA) or Elliptic Curve Cryptography (ECC) key generation algorithm can be used to generate public/private key pairs. In the illustrated embodiment, the value generated by the PUF (104) can replace a random number used to generate a public/private key pair. Specifically, the value generated by the PUF (104) can be used to seed the key generation logic (110). After seeding using the PUF (104) value, the key generation logic (110) can implement any asymmetric key generation algorithm to generate a public/private key pair.

In an embodiment, key generation logic (110) can write the public/private key pair to key and certificate storage area (106). In an embodiment, key generation logic (110) can write the public key to a non-volatile portion of the key and certificate storage area (106). In an embodiment, key generation logic (110) can write the private key to a volatile portion of the key and certificate storage area (106). In some embodiments, key generation logic (110) can only write the public key to the key and certificate storage area (106) and may not write the private key to the key and certificate storage area (106). In such an embodiment, key generation logic (110) may only store the private key in a register or similar temporary storage location. In one embodiment, since the key generation logic (110) uses the value of the PUF (104), key generation logic (110) can faithfully re-generate public/private key pairs on demand and thus is not required to store keys for use in downstream applications. Thus, in some embodiments, key generation logic (110) may not persist either the public or private keys to a non-volatile storage location. In one embodiment, the key pairs generated by key generation logic (110) can comprise device identity keys. In one embodiment, the device identity keys can be used as a root of trust in a layered cryptographic identity system such as a Device Identifier Composition Engine (DICE) or similar architecture.

In the illustrated embodiment, certificate signing request logic (112) comprises executable code and/or dedicated hardware circuitry to generate a certificate signing request (CSR) and transmit a CSR to a certificate authority (CA). In some embodiments, certificate signing request logic (112) can further be configured to receive a digital certificate from the CA and write the CA to key and certificate storage area (106). In one embodiment, certificate signing request logic (112) can generate a CSR formatted according to a defined standard such as PKCS #10. In an embodiment, certificate signing request logic (112) includes the public key generated by key generation logic (110) in the CSR. In an embodiment, the certificate signing request logic (112) further includes an identifier of a user in the CSR. For example, in a PKCS #10 CSR, the certificate signing request logic (112) can include an identifier of the user in the common name (CN) field of the PKCS #10 CSR.

In one embodiment, certificate signing request logic (112) generates the CSR when a user purchases a memory device (100). For example, the certificate signing request logic (112) can be executed by a manufacturer prior to being released to a customer. When a customer purchases the memory device (100), it can provide identifying information (e.g., company name, driver's license, passport, etc.). No limit is placed on the type of information that can be used to identify a user so long as the information can be used to identify the user of the memory device. In response, the manufacturer executes the certificate signing request logic (112) to generate the CSR using the identifying information of the user as well as the public key that is unique to the memory device (100).

The certificate signing request logic (112) then transmits the CSR to a CA. In one embodiment, the memory device (100) can transmit the CSR directly to the CA. In this embodiment, the memory device (100) can include a network interface to allow for network communications. In another embodiment, an intermediary device (e.g., a host processor) can be used to facilitate communications with the CA.

The certificate signing request logic (112) receives a digital certificate generated by the CA in response to the CSR. In an embodiment, the digital certificate can comprise an X.509 certificate issued by a trusted CA. In response, the certificate signing request logic (112) stores the digital certificate in the key and certificate storage area (106). In an embodiment, the certificate signing request logic (112) can write the digital certificate to a write-protected region of key and certificate storage area (106).

In the illustrated embodiment, message signing logic (114) comprises executable code and/or dedicated hardware circuitry to sign messages received from, for example, a host processor (not illustrated). In an embodiment, a memory device (100) can expose an application programming interface (API) that allows the host processor to request the signing of messages by the memory device (100). No limit is placed on the type of messages that the memory device (100) can receive via the API. Examples of messages include emails, payment requests, login requests, etc.

In response to a message, the message signing logic (114) can generate a digital signature based on the message. In an embodiment, the message signing logic (114) can utilize a digital signature algorithm such as RSA or ECDSA to generate a digital signature for a message. In an embodiment, the message signing logic (114) uses the private key generated by key generation logic (110) to generate a digital signature. The specific details of the digital signature algorithm are not limiting, and various other digital signature algorithms can be used. After generating the digital signature, the message signing logic (114) returns the digital signature to the calling device (e.g., host processor). In one embodiment, message signing logic (114) can be configured to generate digital signatures for mobile identifiers read from the mobile identifier storage area (116), as discussed in blocks 402 and 404 of FIG. 4. In one embodiment, the public key generated by key generation logic (110) can be provided to the calling device (e.g., host processor) and thus used in, for example, a cellular network attachment and authentication procedure, as described in FIG. 4.

In one embodiment, a memory device (100) includes an interface (118) to connect to a host processor (not illustrated). In one embodiment, the host processor can comprise a general-purpose processor, a baseband processor, or a similar processor. In one embodiment, interface (118) can comprise a serial peripheral interface (SPI) or universal serial bus (USB) interface. The specific protocol used is not limiting. In one embodiment, a memory device (100) can be installed in a mobile device or another cellular-capable device.

Figure 2:
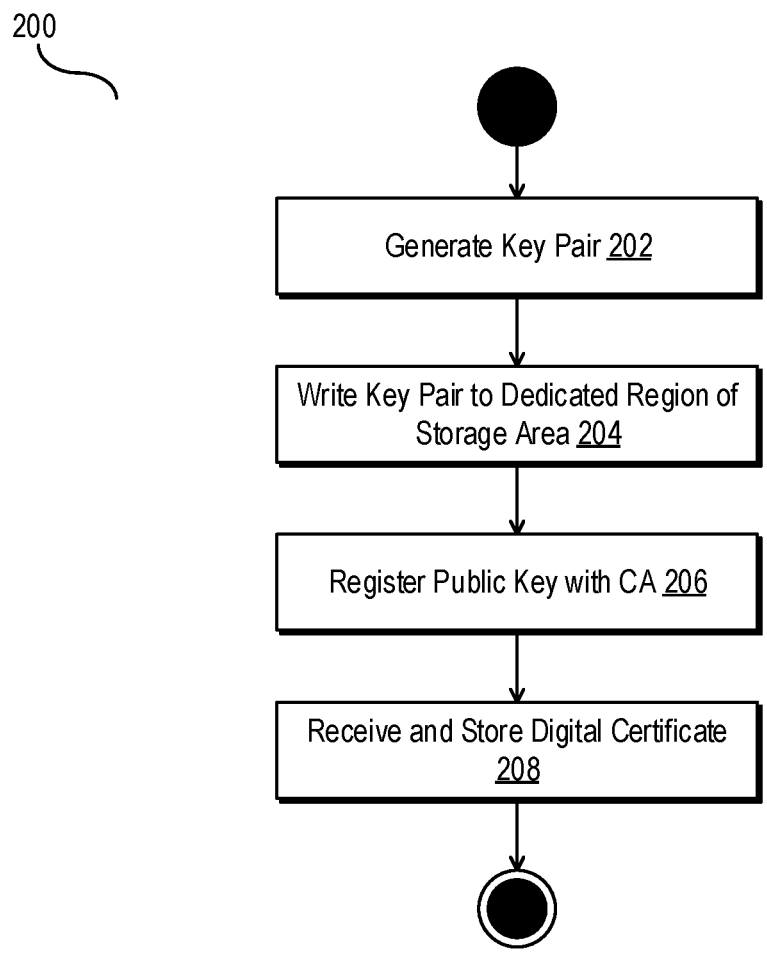
FIG. 2 is a flow diagram illustrating a method for generating a key pair according to some embodiments of the disclosure.

FIG. 2 is a flow diagram illustrating a method for generating a key pair according to some embodiments of the disclosure.

In block 202, method 200 can include generating a key pair.

In an embodiment, the key pair comprises an asymmetric public/private key pair. In an embodiment, method 200 reads a value from a PUF and uses this value to generate a public/private key pair. In some embodiments, method 200 can generate a public/private key pair using an asymmetric or public-key cryptosystem. For example, an RSA or ECC key generation algorithm can be used to generate public/private key pairs. In the illustrated embodiment, the value generated by the PUF can replace a random number used to generate a public/private key pair. Specifically, the value generated by the PUF can be used as a seed prior to generating the key pair. After seeding using the PUF value, method 200 can implement any asymmetric key generation algorithm to generate a public/private key pair. In one embodiment, method 200 can execute block 202 in response to a command received from an external device (e.g., host processor). Alternatively, or in conjunction with the foregoing, method 200 can execute block 202 automatically on starting up or powering on.

In block 204, method 200 can write the key pair to a dedicated region of a storage area.

In an embodiment, method 200 can write the public key to a non-volatile portion of a storage area. In an embodiment, method 200 can write the private key to a volatile portion of the storage area. In some embodiments, method 200 may only write the public key to the storage area and may not write the private key to the storage area. In such an embodiment, method 200 may only store the private key in a register or similar temporary storage location. In one embodiment, the dedicated region of the storage area can comprise a write-protected region of the storage area. In one embodiment, since method 200 uses the value of the PUF, method 200 can faithfully re-generate public/private key pairs on demand and thus is not required to store keys for use in downstream applications. Thus, in some embodiments, block 204 can be optional.

In block 206, method 200 registers the public key of the key pair with a CA.

In the illustrated embodiment, registering the public key in block 206 comprises generating a CSR formatted according to a defined standard such as PKCS #10. In an embodiment, method 200 includes the public key generated in block 202 in the CSR. In an embodiment, method 200 includes an identifier of a user in the CSR. In one embodiment, method 200 generates the CSR when a user purchases a memory device implementing method 200. For example, method 200 can be executed by a manufacturer prior to being released to a customer. When a customer purchases a memory device, it can provide identifying information (e.g., company name, driver's license, passport, etc.). No limit is placed on the type of information that can be used to identify a user so long as the information can be used to identify the user of the memory device. In response, the manufacturer executes method 200 to generate the CSR using the identifying information of the user as well as the public key that is unique to the memory device. In an embodiment, registering the public key further comprises transmitting the CSR to a CA over a network such as the Internet.

In block 208, method 200 receives and stores a digital certificate received from the CA.

In an embodiment, method 200 receives a digital certificate generated by the CA in response to the CSR. In an embodiment, the digital certificate can comprise an X.509 certificate issued by a trusted CA. In response, method 200 stores the digital certificate in the dedicated region of a storage area as discussed in block 204.

As a result, at the conclusion of method 200, a memory device executing method 200 can persistently store a secure digital certificate that is unique tied to both the memory device (via the PUF-based public key) and a specific user or organization (via the common name field of the certificate).

Figure 3:
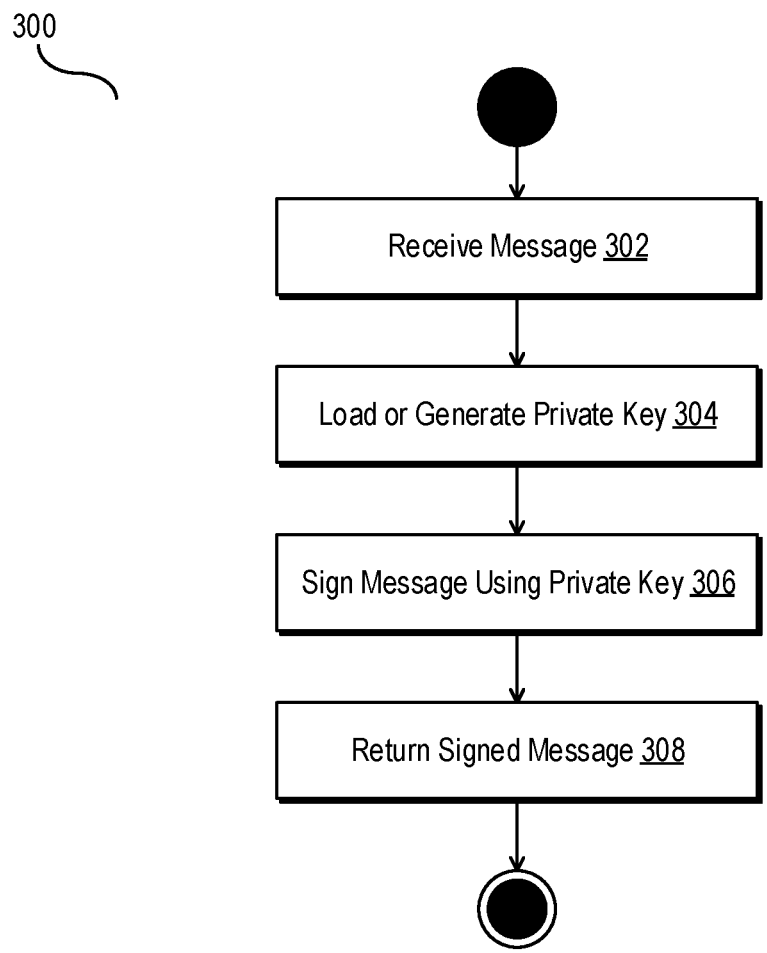
FIG. 3 is a flow diagram illustrating a method for signing messages according to some embodiments of the disclosure.

FIG. 3 is a flow diagram illustrating a method for signing messages according to some embodiments of the disclosure.

In block 302, method 300 can include receiving a message.

In an embodiment, method 300 receives a message from an external device such as a host processor. In an embodiment, method 300 is executed by the firmware of a memory device. In an embodiment, method 300 can expose an application programming interface (API) that allows the host processor to request the signing of messages. No limit is placed on the type of messages that method 300 can receive. Examples of messages include emails, payment requests, login requests, etc.

In block 304, method 300 can include loading or generating a private key.

In an embodiment, method 300 can load a private key from a dedicated area of a storage array such as a confidential/inaccessible storage location. In one embodiment, the PID can write the public portion of the key pair to a write-protected region while writing the private key portion to a confidential/inaccessible storage location. In some embodiments, the private key need not be written to storage at all. In such embodiments, method 300 can automatically generate a private key using, for example, block 202 of FIG. 2. Since the public/private key pair is generated using a PUF, the key pair (and thus private key) can be arbitrarily regenerated as needed. As such, a memory device executing methods 200 and 300 need not persistently store a private key and can thus ensure the security of the private key since the private key can be removed upon power off.

In some embodiments, method 300 can comprise generating a second public/private key pair, the second public/private key pair different from that generated in block 202. In these embodiments, the public/private key pair is referred to as a derived key. In an embodiment, the derived private key can be signed by the device identity key generated in block 202 and can form a CA key chain (since the device identity key is signed by a trusted CA). The CN of the new key CA can have an owner's other identity, such as email, etc. Therefore, a given owner can access different servers with different keys and identities.

In block 306, method 300 can include signing the message using the private key.

In response to a message, method 300 can generate a digital signature based on the message. In an embodiment, method 300 can utilize a digital signature algorithm such as RSA or ECDSA to generate a digital signature for a message. The specific details of the digital signature algorithm are not limiting, and various other digital signature algorithms can be used.

In block 308, method 300 can include returning the signed message.

In an embodiment, after generating the digital signature, method 300 returns the digital signature to the calling device (e.g., host processor). In an embodiment, the public key can be provided to the calling device (e.g., host processor) and thus used in, for example, a cellular network attachment and authentication procedure, as described in FIG. 4.

In these embodiments, a memory device (e.g., Flash device) can be used as a message signing co-processor that can sign any arbitrary message. Since the cryptographic aspects (e.g., public/private key pair, certificate, etc.) are secured in the memory device and not exposed to sideband or laboratory attacks, the security of the message signing process can be guaranteed.

Figure 4:
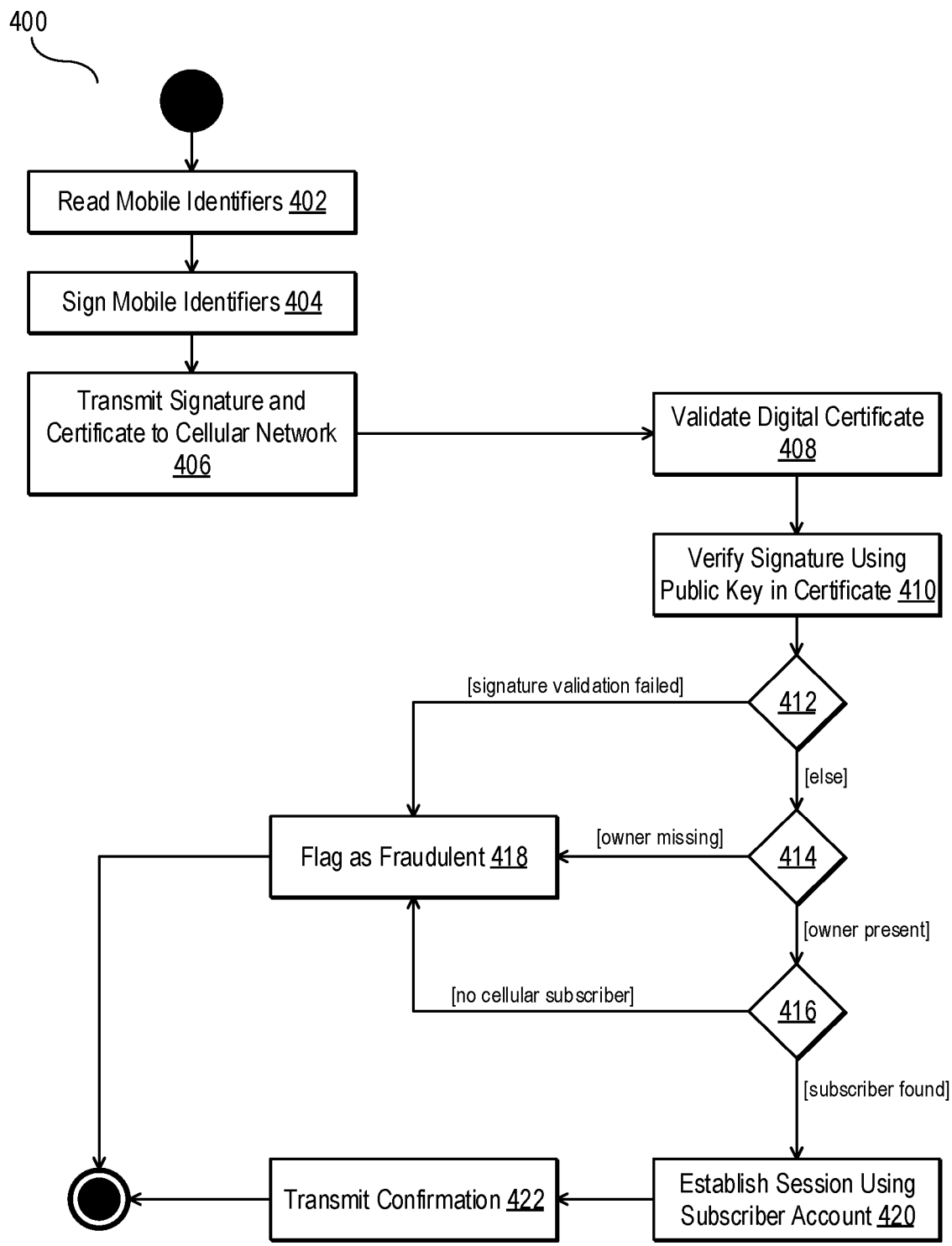
FIG. 4 is a flow diagram illustrating a method for authenticating with a cellular network according to some embodiments of the disclosure.

FIG. 4 is a flow diagram illustrating a method for authenticating with a cellular network according to some embodiments of the disclosure.

In block 402, method 400 can comprise reading mobile identifiers from a storage area of a memory device.

In one embodiment, the memory device can comprise the memory device discussed in connection with FIG. 1. In one embodiment, the storage area can comprise a write-protected storage area of the memory device, such as a write-protected region of a NAND Flash storage array.

In some embodiments, the mobile identifiers can include an ESN, MDN, CTN, IMEI, IMSI, MEID, SUPI, SUCI, or similar types of values used by a cellular network to identify a subscriber or mobile device. In some embodiments, the mobile identifiers read in block 402 may comprise one of these mobile identifiers. In other embodiments, the mobile identifiers read in block 402 may comprise multiple such mobile identifiers. For example, method 400 can read an ESN and MDN as part of block 402. Any mobile identifier, or combination of mobile identifiers, that can uniquely identify a cellular subscriber can be used.

In one embodiment, the memory device storing these mobile identifiers is installed within a mobile device (e.g., mobile phone, tablet, Internet-of-Things device) and is communicatively coupled to a host processor (e.g., baseband processor or core processor). The host processor reads data from the memory device during operations to authenticate to a cellular network. Although cellular networks are discussed, other networks (e.g., satellite, terrestrial) may be used as well; indeed, any network that relies upon identifiers to identifying user accounts can be used.

In one embodiment, the mobile identifiers are stored within a write-protected region of the storage area of a memory device. In one embodiment, the memory device exposes a limited application programming interface (API) to allow access to this write-protected region. In one embodiment, this API may only allow for read access to the write-protected region. In one embodiment, the API may require read commands to be signed using a private key corresponding to a public key written in an inaccessible location of the memory device. Various other techniques can be employed to prevent unauthorized access to mobile identifiers. However, as will be discussed, various other features ensure the security of the use of mobile identifiers.

In current systems, if a malicious party obtains or clones the mobile identifiers read in block 402, the malicious party can incur charges on the account associated with the mobile identifiers. Generally, a malicious party that obtains the mobile identifiers submits these mobile identifiers to the cellular network to authenticate and can then communicate using the cellular network under the account holder's identity. As will be discussed next, the following process prevents such attacks.

In block 404, method 400 can comprise digitally signing the mobile identifiers read in block 402.

In one embodiment, method 400 signs the mobile identifiers using a digital signature algorithm such as RSA or ECDSA. The specific choice of a digital signature algorithm is not limiting. In one embodiment, method 400 signs the mobile identifiers using a private key. In one embodiment, the private key comprises a private key generated using a PUF value, as previously discussed. Specifically, the private key may comprise the private key generated according to FIG. 2. In some embodiments, this private key is never persisted and can be re-generated consistently using the PUF value, as discussed more fully in FIG. 2. As one example, method 400 can combine an ESN identifier and MDN identifier into a single string value and compute a hash (e.g., using an SHA-512 algorithm) of the combined data. Method 400 can then compute a digital signature using a well-established algorithm (e.g., RSA or ECDSA) and use the output of the algorithm as the digital signature.

In some embodiments, blocks 402 and 404 can be performed at various points in time. In one embodiment, method 400 can execute blocks 402 and 404 when a mobile device attempts to connect to a cellular network (e.g., during a network attachment procedure). Alternatively, or in conjunction with the foregoing, method 400 can execute blocks 402 and 404 for each communication sent from the mobile device (e.g., for each voice call, each text message, or each packet data network request).

In some embodiments, method 400 can determine when to execute blocks 402 and 404 based on the type of mobile identifier and, in some embodiments, the type of communication. That is, the specific mobile identifier(s) read in block 402 may vary depending on the context of the mobile device communications. For example, before a mobile device attempts a voice call, method 400 can read an ESN in block 402 (alone or in combination with other mobile identifiers) and sign the ESN (alone or in combination with other mobile identifiers) in block 404. Similarly, before a mobile device attempts a perform a network attachment operation, method 400 can read an IMSI in block 402 (alone or in combination with other mobile identifiers) and sign the IMSI (alone or in combination with other mobile identifiers) in block 404.

In some embodiments, blocks 402 and 404 can be performed for each attempted communication. In other embodiments, method 400 can compute the digital signature for each mobile identifier (and for each combination of mobile identifiers) in advance and store the digital signatures for future use. In one embodiment, method 400 can generate these signatures on power-up and store the digital signatures in a secure storage location (i.e., an inaccessible storage location).

In one embodiment, block 404 can further comprise generating a nonce value and combining the nonce value with the mobile identifiers prior to generating a signature. In one embodiment, the nonce value can comprise a random number or pseudo-random number. In such embodiment, a nonce value can be used to prevent a replay attack if signed versions of the mobile identifiers are leaked. In embodiments where a nonce value is used, such a nonce value is part of the mobile identifiers in the following steps. Discussion of nonce values is thus not repeated for each step (e.g., signature validation).

In block 406, method 400 can comprise transmitting the digital signature and a public key of the memory device to a cellular network. In one embodiment, block 406 comprises sending a digital certificate, such as that generated and stored as described in FIG. 2. In this embodiment, the public key of the memory device is included in the digital certificate in a standardized location. In one embodiment, block 406 can further include sending the mobile identifiers read in block 402 and signed in block 404.

In the illustrated embodiment, blocks 402, 406, and 408 can be performed by a mobile device equipped with a memory device such as that depicted in FIG. 1. Conversely, blocks 410, 412, 414, 416, 418, 420, and 422 can be performed by a computing device in a radio access network (RAN) or core network of a cellular network. In some embodiments, blocks 410, 412, 414, 416, 418, 420, and 422 can be performed by multiple computing devices in a cellular network. No limitation is placed on the type and number of computing devices that can perform blocks 410, 412, 414, 416, 418, 420, and 422. For example, in some embodiments, blocks 410, 412, 414, 416, 418, 420, and 422 can be performed by a Home Subscriber Server (HSS) of a 4G LTE network or an Access and Mobility Management Function (AMF) of a 5G network. In some embodiments, blocks 410, 412, 414, 416, 418, 420, and 422 can be executed by an eNodeB or gNodeB of a 4G or 5G network, respectively.

In block 408, method 400 can comprise validating a digital certificate. As discussed, in one embodiment, a client device transmits a digital certificate to a cellular network device. In block 408, method 400 can validate this digital certificate by verifying a signature (generated by the CA) in the digital certificate using a public key of the CA. In some embodiments, this process can be performed using standardized digital certificate verification routines, and details of those processes are not included herein for the sake of clarity. At the end of block 408, method 400 can confirm that the digital certificate was properly issued by a corresponding CA and has not been tampered with. As discussed previously, the digital certificate can include a public key of the sender device (e.g., mobile device) as well as owner/user information in, for example, a common name field.

In block 410, method 400 can comprise verifying the signature generated in block 404 using the public key in the certificate.

In one embodiment, method 400 receives the signature and the corresponding mobile identifiers used in blocks 402 and 404. As discussed, a valid cellular subscriber signs the mobile identifiers with the private key that is uniquely tied to the memory device. Since this private key is never persisted and is regenerable based on a PUF value, this private key can be secured from malicious attackers. Specifically, the private key does not need to be exposed and can be used in an ad hoc manner when generating signatures. By contrast, existing systems generally require the persistent storage of private keys in a secure location (e.g., a hardware security module or secure enclave). While such devices provide security, they are subject to attacks, most notably when devices are powered off. By contrast, the memory device only generates a private key when needed and, due to the PUF value, does not need to permanently store the private key.

As discussed above, the public/private key pair can be generated during manufacturing, and the corresponding digital certificate can also be generated during manufacturing. Thus, the digital certificate stored in a write-protected area of memory is associated with the public/private key pair. Thus, in block 410, a cellular network computing device can use the public key in the digital certificate to verify the digital signature associated with the mobile identifiers. To perform this verification, as one example, the cellular network computing device can compute a hash of the received mobile identifiers and then decrypt the signature using the public key to obtain a decrypted signature. The cellular network computing device can then compare the decrypted signature with the hash to determine if the signature is valid.

In the illustrated embodiment, after block 408, method 400 can confirm that a public key is associated with a specific owner or user. However, digital certificates can be stolen or intercepted; thus, in block 410, method 400 uses the digital signature to confirm that the sending device (e.g., mobile phone) is indeed owned by the owner/user of the digital certificate. Since the private key does not leave the memory device, it can be confirmed that if the signature is valid, the memory device can be trusted and can be associated with an owner/user identified in the digital certificate.

In blocks 412, 414, and 416, method 400 can perform various checks to determine whether the request and/or device issuing the request is a valid request and/or valid device, respectively.

In block 412, method 400 can comprise determining whether the signature validation failed in block 410. As discussed, signature validation will fail if the decrypted signature does not match the expected hash value of the mobile identifiers. Other signature algorithms can be used. If the signature validation fails, method 400 can proceed directly to block 418.

In block 414, method 400 can comprise determining if an owner or user field is present in the digital certificate. In one embodiment, this field corresponds to a Subject field of, for example, an X.509 certificate. In one embodiment, the field can further comprise the common name (CN) or owner (O) field. In one embodiment, if method 400 cannot identify an owner or user field, method 400 can proceed directly to block 418.

In block 414, method 400 can comprise determining if a corresponding cellular subscriber is found for the owner/user in the digital certificate. In one embodiment, method 400 can comprise querying a database of known cellular subscribers (e.g., in a data store backing an HSS or AMF). In one embodiment, method 400 can query such a database using fields in the digital certificate, such as the CN or O fields. In one embodiment, if method 400 cannot identify a cellular subscriber, method 400 can proceed directly to block 418.

In block 418, method 400 can flag the request as fraudulent. In one embodiment, block 418 can comprise terminating the request and, in some embodiments, blocking future requests from the device issuing the fraudulent request. In some embodiments, block 418 can comprise logging the fraudulent request and reporting the request to the appropriate legal authorities.

In some embodiments, block 418 can comprise additional actions based on the type of failure. For example, if method 400 determines that a cellular subscriber is not found in block 416, method 400 can transmit a web page or other interface to the client to allow the user to create a cellular account. As another example, if a cellular subscriber account for the user is not found, but a cellular subscriber account for a user's organization is found, the cellular network may automatically provision a new cellular subscriber account for the user. As another example, method 400 can further provide error information to the client device indicating what error has occurred (e.g., invalid digital certificate). Various other remedial actions can be taken, and the disclosure is not limited to only the above examples.

In block 420, if method 400 determines that all checks in blocks 412, 414, and 416 pass, method 400 can establish a cellular session using the subscriber account. Details of establishing a cellular session are outside the scope of the disclosure, but generally any existing cellular network technologies can be used to establish a session. In brief, the cellular network will allow voice and/or data communications and associate these communications with the cellular subscriber's account to enable billing for the account as well as performing authentication, authorization, and accounting (AAA).

In block 422, method 400 ends the verification by transmitting a confirmation to the client device. In one embodiment, the confirmation can be explicit, such as a message or other communication. In other embodiments, the confirmation can be implicit, such as by allowing a phone call, delivering a message, or responding to a packet data network request.

As discussed, method 400 enables a memory device to be "plugged" into a mobile phone and immediately transfer an owner's cellular account to a new phone. In some embodiments, the foregoing method 400 means that a SIM card is no longer required for authentication.

Figure 5:
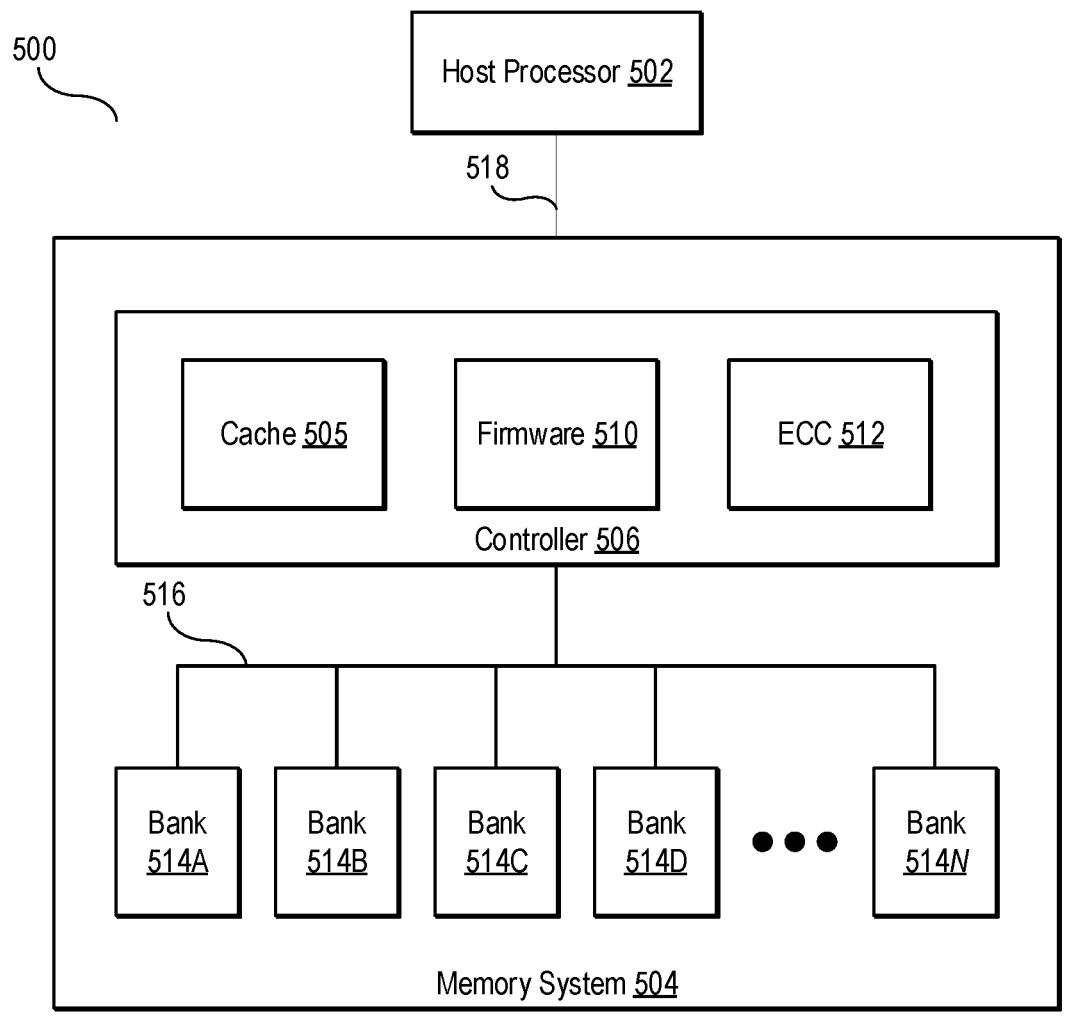
FIG. 5 is a block diagram illustrating a memory system according to some embodiments of the disclosure.

FIG. 5 is a block diagram illustrating a memory system according to some embodiments of the disclosure. Various features of FIG. 5 have been described logically in the description of FIG. 1, and those features are incorporated herein by reference in their entirety.

As illustrated in FIG. 5, a computing system (500) includes a host processor (502) communicatively coupled to a memory system (504) via a bus (518). The memory system (504) comprises a controller (506) communicatively coupled to one or more memory banks (514A-514N), forming a memory array via a bus/interface (516). As illustrated, the controller (506) includes a local cache (505), firmware (510), and an error correction code (ECC) module (512).

In the illustrated embodiment, a host processor (502) can comprise any type of computer processor, e.g., a central processing unit (CPU), graphics processing unit (GPU), or other types of general-purpose or special-purpose computing devices. The host processor (502) includes one or more output ports that allow for the transmission of address, user, and control data between the host processor (502) and the memory system (504). In the illustrated embodiment, this communication is performed over the bus (515). In one embodiment, the bus (518) comprises an input/output (I/O) bus or a similar type of bus.

The memory system (504) is responsible for managing one or more memory banks (514A-514N). In one embodiment, the banks (514A-514N) comprise NAND Flash dies or other configurations of non-volatile memory. In one embodiment, the memory banks (514A-514N) comprise a memory array.

The banks (514A-514N) are managed by the controller (506). In some embodiments, the controller (506) comprises a computing device configured to mediate access to and from banks (514A-514N). In one embodiment, the controller (506) comprises an ASIC or other circuitry installed on a printed circuit board housing the banks (514A-514N). In some embodiments, the controller (506) may be physically separate from the banks (514A-514N). The controller (506) communicates with the banks (514A-514N) over the interface (516). In some embodiments, this interface (516) comprises a physically wired (e.g., traced) interface. In other embodiments, the interface (516) comprises a standard bus for communicating with banks (514A-514N).

The controller (506) comprises various modules (505-512). In one embodiment, the various modules (505-512) comprise various physically distinct modules or circuits. In other embodiments, the modules (505-512) may completely (or partially) be implemented in software or firmware.

As illustrated, firmware (510) comprises the core of the controller and manages all operations of the controller (506). The firmware (510) may implement some or all of the methods described above.

Figure 6:
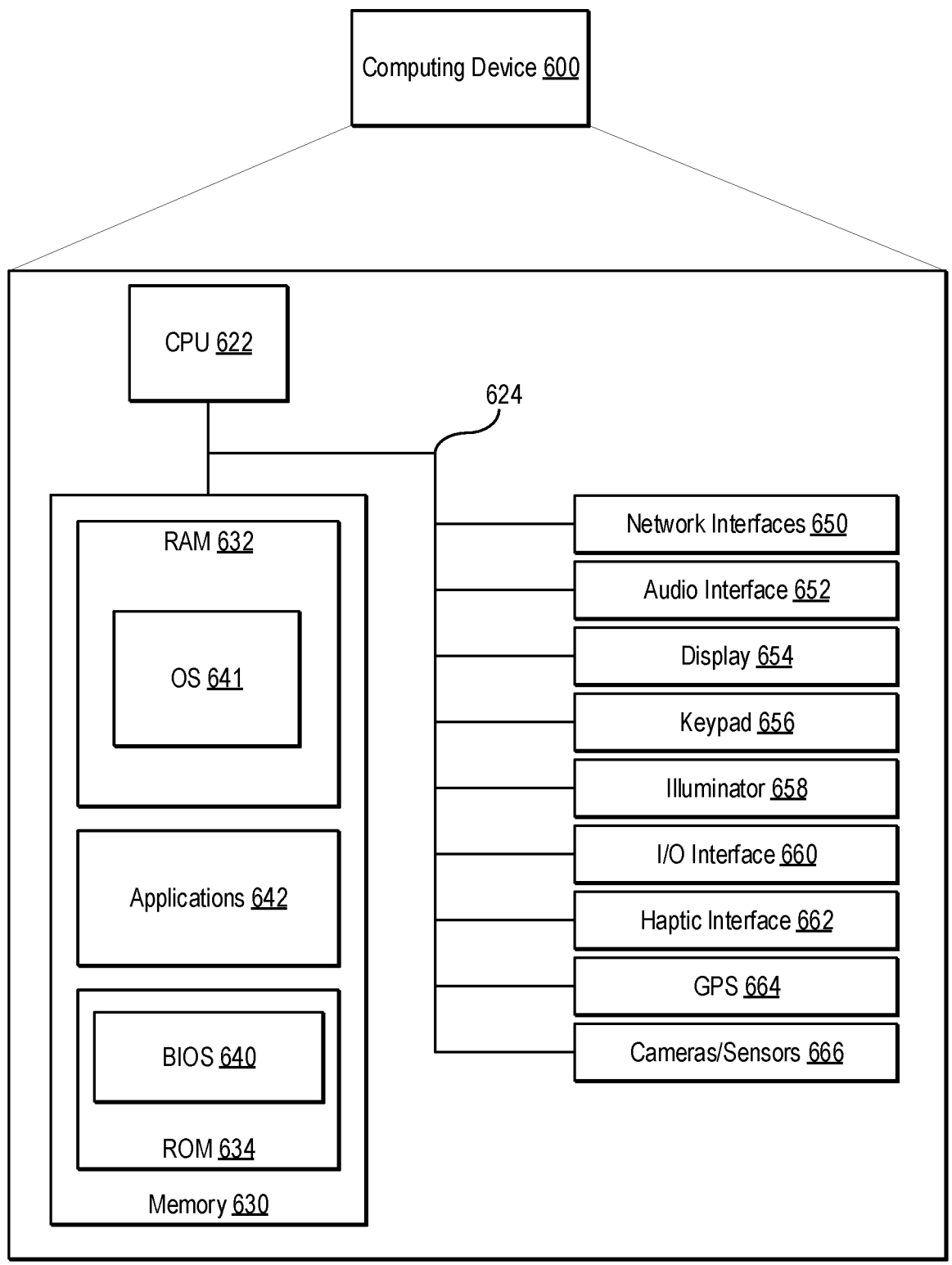
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The device (600) can include more or fewer components than those shown in FIG. 6, depending on the deployment or usage of the device (600). For example, a server computing device, such as a rack-mounted server, may not include an audio interface (652), display (654), keypad (656), illuminator (658), haptic interface (662), Global Positioning System (GPS) receiver (664), or cameras/sensors (666). Some devices can include additional components not shown, such as graphics processing unit (GPU) devices, cryptographic co-processors, artificial intelligence (AI) accelerators, or other peripheral devices.

As shown in the figure, the device (600) includes a central processing unit, CPU (622), in communication with a mass memory (630) via a bus (624). The device (600) also includes a network interface (650), an audio interface (652), a display (654), a keypad (656), an illuminator (658), an input/output interface (660), a haptic interface (662), a GPS receiver (664) and a camera(s) or other optical, thermal, or electromagnetic sensors such as cameras/sensors (666). Device (600) can include one camera/sensor or a plurality of cameras/sensors (666). The positioning of the cameras/sensors (666) on the device (600) can change per device (600) model, per device (600) capabilities, and the like, or some combination thereof.

In some embodiments, the CPU (622) can comprise a general-purpose CPU. The CPU (622) can comprise a single-core or multiple-core CPU. The CPU (622) can comprise a system-on-a-chip (SoC) or a similar embedded system. In some embodiments, a GPU can be used in place of, or in combination with, a CPU (622). Mass memory (630) can comprise a dynamic random-access memory (DRAM) device, a static random-access memory device (SRAM), or a Flash (e.g., NAND Flash) memory device. In some embodiments, mass memory (630) can comprise a combination of such memory types. In one embodiment, the bus (624) can comprise a Peripheral Component Interconnect Express (PCIe) bus. In some embodiments, the bus (624) can comprise multiple busses instead of a single bus.

Mass memory (630) illustrates another example of computer storage media for the storage of information such as computer-readable instructions, data structures, program modules, or other data. Mass memory (630) stores a basic input/output system, BIOS (640), for controlling the low-level operation of the device (600). In the illustrated embodiment, the BIOS (640) may be stored in a read-only memory (ROM) such as ROM (634). The mass memory also stores an operating system (641) for controlling the operation of the device (600).

Applications (642) can include computer-executable instructions which, when executed by the device (600), perform any of the methods (or portions of the methods) described previously in the description of the preceding Figures. In some embodiments, the software or programs implementing the method embodiments can be read from a hard disk drive (not illustrated) and temporarily stored in RAM (632) by CPU (622). CPU (622) can then read the software or data from RAM (632), process them, and store them in RAM (632) again.

The device (600) can optionally communicate with a base station (not shown) or directly with another computing device. Network interface (650) is sometimes known as a transceiver, transceiving device, or network interface card (NIC).

The audio interface (652) produces and receives audio signals such as the sound of a human voice. For example, the audio interface (652) can be coupled to a speaker and microphone (not shown) to enable telecommunication with others or generate an audio acknowledgment for some action. Display (654) can be a liquid crystal display (LCD), gas plasma, light-emitting diode (LED), or any other type of display used with a computing device. Display (654) can also include a touch-sensitive screen arranged to receive input from an object such as a stylus or a digit from a human hand.

Keypad (656) can comprise any input device arranged to receive input from a user. Illuminator (658) can provide a status indication or provide light.

The device (600) also comprises an input/output interface (660) for communicating with external devices, using communication technologies, such as USB, infrared, Bluetooth®, or the like. The haptic interface (662) provides tactile feedback to a user of the client device.

The GPS receiver (664) can determine the physical coordinates of the device (600) on the surface of the Earth, which typically outputs a location as latitude and longitude values. GPS receiver (664) can also employ other geo-positioning mechanisms, including, but not limited to, triangulation, assisted GPS (AGPS), E-OTD, CI, SAI, ETA, BSS, or the like, to further determine the physical location of the device (600) on the surface of the Earth. In one embodiment, however, the device (600) can communicate through other components, provide other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    generating, by a mobile device, a digital signature of a mobile identifier associated with a cellular network subscriber using a value generated by a physically unclonable function (PUF);
    transmitting, by the mobile device, the digital signature and a public key to a cellular network; and
    receiving, by the mobile device from the cellular network, a confirmation of access to the cellular network based on the public key and the digital signature.

2. The method of claim 1, wherein reading a mobile identifier comprises reading one or more of an electronic serial number (ESN), mobile device number (MDN), cellular telephone number (CTN), international mobile equipment identity (IMEI), international mobile subscriber identity (IMSI), mobile equipment identifier (MEID), subscription permanent identifier (SUPI), or subscription concealed identifier (SUCI).

3. The method of claim 1, wherein reading a mobile identifier comprises identifying a type of mobile identifier based on a type of communications between the mobile device and the cellular network.

4. The method of claim 1, wherein reading a mobile identifier further include reading the mobile identifier in response to performing a network attachment with the cellular network.

5. The method of claim 1, wherein transmitting a public key comprises transmitting a digital certificate, the digital certificate including the public key.

6. The method of claim 5, further comprising:
    receiving, by a computing device of the cellular network, the digital signature and the public key;
    validating, by the computing device, the digital signature using the public key; and
    confirming, by the computing device, an identity of the mobile device based on the digital certificate.

7. The method of claim 6, wherein confirming the identity of the mobile device based on the digital certificate comprises:
    determining, by the computing device, that the digital certificate includes a common name field;
    determining, by the computing device, that the common name field is associated with a known subscriber account; and
    establishing, by the computing device, a session using the known subscriber account.

8. The method of claim 1, further comprising transmitting the mobile identifier to a cellular network when transmitting the digital signature and the public key.

9. A memory device comprising:
    a storage area, the storage area storing a mobile identifier, the mobile identifier comprising a value associated with a subscriber of a cellular network;
    a physically unclonable function (PUF), the PUF generating a unique value; and
    firmware, the firmware including instructions for:
        generating a digital signature of a mobile identifier associated with a cellular network subscriber using a value generated by a physically unclonable function (PUF);
        transmitting the digital signature and a public key to a cellular network; and
        receiving, from the cellular network, a confirmation of access to the cellular network based on the public key and the digital signature.

10. The memory device of claim 9, wherein reading a mobile identifier comprises reading one or more of an electronic serial number (ESN), mobile device number (MDN), cellular telephone number (CTN), international mobile equipment identity (IMEI), international mobile subscriber identity (IMSI), mobile equipment identifier (MEID), subscription permanent identifier (SUPI), or subscription concealed identifier (SUCI).

11. The memory device of claim 9, wherein reading a mobile identifier comprises identifying a type of mobile identifier based on a type of communications with the cellular network.

12. The memory device of claim 9, wherein reading a mobile identifier further include reading the mobile identifier in response to performing a network attachment with the cellular network.

13. The memory device of claim 9, wherein transmitting a public key comprises transmitting a digital certificate, the digital certificate including the public key.

14. The memory device of claim 9, further comprising transmitting the mobile identifier to a cellular network when transmitting the digital signature and the public key.

15. A non-transitory computer-readable storage medium for tangibly storing computer program instructions capable of being executed by a computer processor, the computer program instructions defining steps of:
generating a digital signature of a mobile identifier associated with a cellular network subscriber using a value generated by a physically unclonable function (PUF);
transmitting the digital signature and a public key to a cellular network; and
receiving, from the cellular network, a confirmation of access to the cellular network based on the public key and the digital signature.

16. The non-transitory computer-readable storage medium of claim 15, wherein reading a mobile identifier comprises reading one or more of an electronic serial number (ESN), mobile device number (MDN), cellular telephone number (CTN), international mobile equipment identity (IMEI), international mobile subscriber identity (IMSI), mobile equipment identifier (MEID), subscription permanent identifier (SUPI), or subscription concealed identifier (SUCI).

17. The non-transitory computer-readable storage medium of claim 15, wherein reading a mobile identifier comprises identifying a type of mobile identifier based on a type of communications with the cellular network.

18. The non-transitory computer-readable storage medium of claim 15, wherein reading a mobile identifier further include reading the mobile identifier in response to performing a network attachment with the cellular network.

19. The non-transitory computer-readable storage medium of claim 15, wherein transmitting a public key comprises transmitting a digital certificate, the digital certificate including the public key.

20. The non-transitory computer-readable storage medium of claim 15, further comprising transmitting the mobile identifier to a cellular network when transmitting the digital signature and the public key.

* * * * *